United States Patent [19]

Kobayashi et al.

[11] Patent Number: 4,905,016
[45] Date of Patent: Feb. 27, 1990

[54] RECORDER WITH A PENCIL PEN AND METHOD THEREFOR

[75] Inventors: Nobuyuki Kobayashi; Yukihiro Kaneko; Tikao Nakagawa; Masatoshi Noguchi; Takamichi Yoshikawa; Masashi Nakamura, all of Tokyo, Japan

[73] Assignee: Graphtec Kabushiki Kaisha, Tokyo, Japan

[21] Appl. No.: 233,154

[22] Filed: Aug. 17, 1988

[30] Foreign Application Priority Data

Aug. 21, 1987 [JP] Japan .................................. 62-208985
Nov. 30, 1987 [JP] Japan ........................... 62-183594[U]
Mar. 18, 1988 [JP] Japan .................................. 63-65367
Apr. 17, 1988 [JP] Japan .................................. 63-95181
Jun. 30, 1988 [JP] Japan .................................. 63-163091

[51] Int. Cl.⁴ ........................ G01D 9/00; G01D 15/16; B41J 3/46
[52] U.S. Cl. ................................ 364/1.1; 346/139 R; 346/139 C; 401/85
[58] Field of Search ................ 346/139 C, 139 R, 1.1; 33/18.1, 18.2; 401/53, 57, 85, 89, 90, 55

[56] References Cited

U.S. PATENT DOCUMENTS 4,352,581 10/1982 Leuthold ............................. 401/85
4,518,972 5/1985 Gunderson ..................... 346/139 R
4,704,797 11/1987 Iai ................................... 346/139 C

FOREIGN PATENT DOCUMENTS 56-115294 9/1981 Japan .
59-400 1/1984 Japan .
61-235199 10/1986 Japan .
61-235200 10/1986 Japan .

Primary Examiner—Bruce A. Reynolds
Assistant Examiner—Mark Reinhart
Attorney, Agent, or Firm—Joseph S. Iandiorio

[57] ABSTRACT

A recorder with a pencil pen which contains a plurality of pencil leads therein comprises means for causing a lead chuck mechanism of the pencil lead to hold and release the pencil lead and means for vertically moving a pencil lead displacement mechanism of the pencil pen. Those means are alternately activated by lead feed-/eject means to eject a consumed unnecessary pencil lead and drive out a new pencil lead and hold it at a recording position. Since the pencil leads can be automatically ejected and driven out, a recording efficiency is improved and long period continuous recording is attained with a single pencil pen. A lead feed/eject holder is provided to eject a residual lead of the pencil pen, and a processing unit for processing the ejected residual lead is provided. Thus, the recording efficiency is further improved.

13 Claims, 14 Drawing Sheets

13 — 719
73 — RECORD PANEL

13 — 719
PENCIL LEAD 15

719
15 — 73

13 — 719
15 — 73

13 — 719
73 — 15

13 — 719
15 — 73

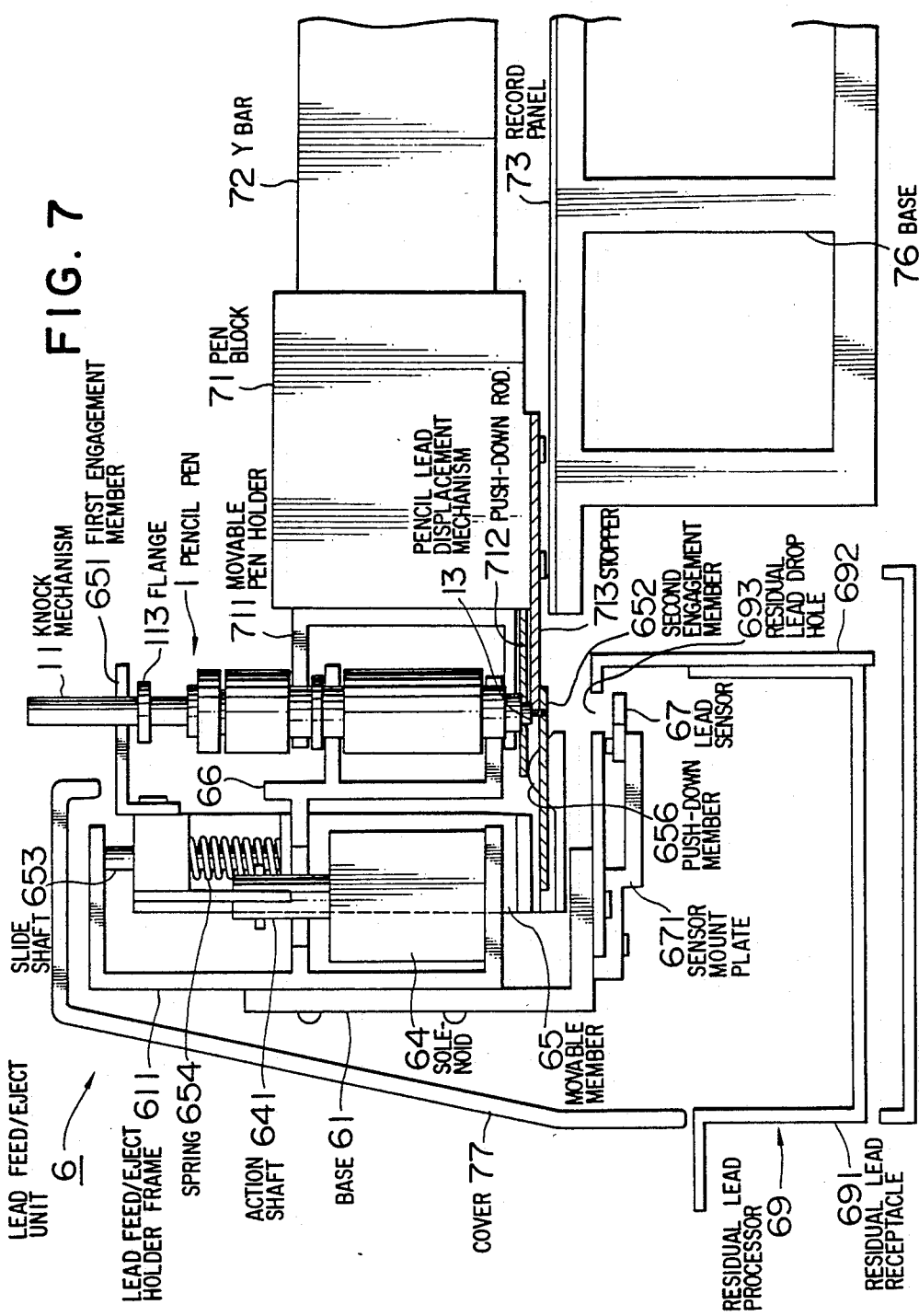

FIG. IIA
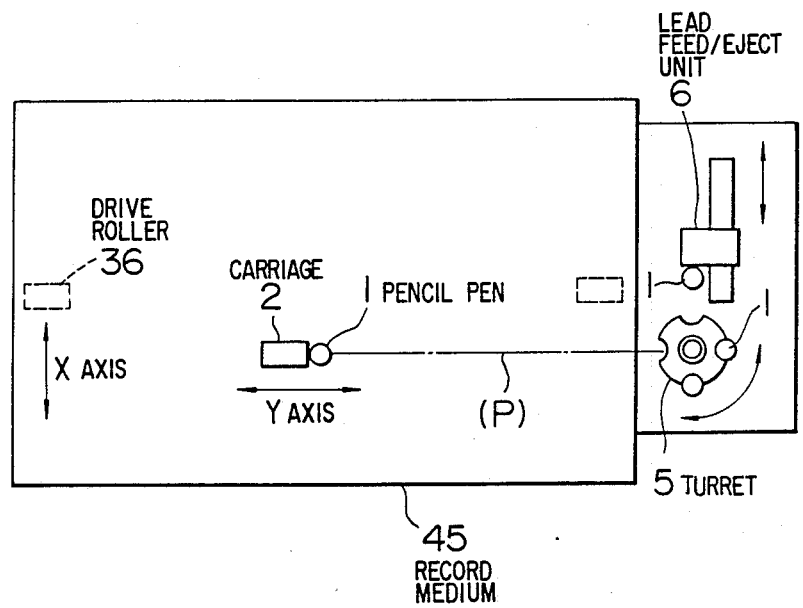

RECORDER WITH A PENCIL PEN AND METHOD THEREFOR

BACKGROUND OF THE INVENTION

The present invention relates to an automatic recorder with a pencil pen having a lead of pencil for recording on a medium by the lead of pencil, and more particularly to a recorder for drafting a drawing by a pen in accordance with a command signal from an external control unit.

Such a recorder is frequently used in connection with a CAD device and it has been widely used because of its capability of rapid drafting of a precise drawing.

The recorder of this type usually uses a drafting ink pen. Since the ink pen is not erasable and it is difficult to correct the drawing drafted by the ink pen, an erasable ink pen has been strongly desired. As a result, the recorder with an erasable pen or pencil pen has been increasingly used.

A prior art pencil pen is explained below. It comprises a lead chuck mechanism for holding and releasing the lead of pencil and a knock mechanism for releasing the lead chuck of the lead chuck mechanism. Because of structural restriction of the recorder, it holds only one lead of pencil. In the recorder with the pencil pen, the lead chuck mechanism is held and released at a fixed position in order to maintain a high drafting quality. If a drive stroke in the hold/release operation is as large as that of a conventional pencil pen, there will be a backlash unless clearances of elements are precisely set, and the drafting quality is lowered. It is difficult to precisely set the clearances of the elements.

In the prior art of pencil pen, since only on pencil lead can be held, it is not possible to automatically and continuously record a long distance of drafting which cannot be drawn without using a plurality of pencil leads.

The following two methods have been proposed to resolve the above problem.

A first method is disclosed in JP-A-61-235199. In this method, a plurality of pencil pens each holding one pencil lead. When the pencil lead of the pencil pen which is currently recording data is exhausted so that the record can no longer be drawn, it is exchanged with one of the pencil pens stored at a predetermined position in the recorder. In this manner, data having long drafting distance can be automatically and continuously recorded.

In this method, however, it is necessary to prepare a plurality of pencil pens of the same type in order to avoid a change of recorded line in the course of recording. As a result, redundant pencil pens are needed.

A second method is disclosed in JP-A-61-235200. In this method, a movable pen block to record data on a medium, a cylindrical multi-lead cartridge held by the pen block for holding a plurality of pencil leads at a constant pitch along a periphery of the pen block, a lead pushing rod held by the pen block for pushing a specific pencil lead selection mechanism for selecting the specific pencil lead from the plurality of pencil leads, and lead pushing rod drive means are used. By systematically operating those elements, data is recorded automatically and continuously.

In the apparatus, however, not only the apparatus is of large scale but various elements are mounted on the pen block and a load to the pen block is high. As a result, the apparatus performance such as recording speed may be affected.

A special apparatusis disclosed in Japanese Utility Model Application Laid-Open No. 56-115,294. The apparatus has a line drafting head including an ejection mechanism for ejecting a redundant pencil lead. Data is recorded by the pencil pen of the line drafting head. When the pencil lead has been exhausted. It is ejected. Because of the provision of the ejection mechanism for the pencil lead, the long period automatic recording can be attained.

In this prior art apparatus, however, since the pencil lead eject mechanism, specifically a solenoid is mounted on the line drafting head which is moved on the medium, the weight of the line drafting head increases. As a result, a drive mechanism for driving the line drafting head becomes of large scale. When the drafting performance, particularly the drafting speed is to be improved, the overall apparatus must be constructed rigidly.

SUMMARY OF THE INVENTION

It is an object of the present invention to provide a recorder with a pencil pen which holds a plurality of pencil leads and automatically drives and ejects the pencil leads.

It is another object of the present invention to provide a recorder having a pencil lead holder for ejecting a residual pencil lead and a residual pencil lead processing unit.

It is other object of the present invention to provide a recorder with a pencil pen which can record for a long time by providing a pencil lead feed and eject mechanism.

It is a further object of the present invention to provide a recorder with a pencil pen which attains continuous recording by only one pencil pen.

In order to achieve the above objects, in accordance with the present invention, means for holding a plurality of pencil leads and feeding and ejecting the pencil leads one by one is provided. More specifically, means for holding and releasing a chuck of the pencil pen and means for vertically moving a pencil lead displacing mechanism are provided and those means are alternately operated.

In an initial state, a plurality of pencil leads are held in a lead tank of a pencil pen. One lead (first lead) is taken from the lead tank into a lead path of the pencil pen. The lead chuck mechanism is now released to hold the pencil lead, and the pencil lead displacing mechanism is actuated to drive the pencil lead for recording. When the first lead has been exhausted and released from the pencil lead chuck mechanism, recording is no longer carried out by the first lead. At this moment, the second pencil lead has entered into the lead path and held by the lead chuck mechanism. By vertically driving the pencil lead displacing mechanism reciprocally, the first lead whose trailing end abuts against a leading end of the second lead is driven by a distance of one vertical drive. Thus, there is a gap of one vertical drive between the trailing and of the first lead and the leading end of the second lead. The lead chuck mechanism is then released once to drive the second lead so that the leading end thereof abuts against the trailing end of the first lead. By alternately actuating the chuck mechanism and the pencil lead displacing mechanism, the first lead which can no longer record is removed.

In accordance with the present invention, the problems encountered in the prior art apparatus are resolved and the following advantages are offered. Namely, since the lead feed and eject mechanism for feeding and ejecting the pencil lead in provided, long time recording can be attained. Since the lead eject holder to remove the residual lead and the residual lead processing unit for processing the residual lead are provided, recording by the pencil pen can be efficiently done.

BRIEF DESCRIPTION OF THE DRAWINGS

FIGS. 3 and 4 show a first embodiment of the recorder and recording method with the pencil pen of the present invention, in which FIG. 3 shows a top view of an overall construction of the apparatus as viewed from the record panel, and FIG. 4 shows a side view of a pen block which serves as lead feed and eject means and a cooperating unit;

FIGS. 6 and 7 show a third embodiment in which FIG. 6 shows a top view of an overall construction of the apparatus as viewed from the record panel, and FIG. 7 shows a side view of a pen block and lead feed and eject means and a cooperating unit;

FIGS. 8A, 8B, 9 and 10 show a fourth embodiment, in which FIG. 8A is a conceptual view showing an arrangement of mechanical units of the embodiment, FIG. 8B shows an electrical block diagram, FIG. 9 shows a perspective view of a lead feed and eject unit and a cooperating unit, and FIG. 10 shows a flow chart for explaining an operation of the embodiment; and FIGS. 11A, 11B and 12 show a fifth embodiment, in which FIG. 11A shows a conceptual view of arrangement of mechanical units in the embodiment, FIG. 11B shows a block diagram of an electrical circuit, and FIG. 12 shows a side view of a lead feed and eject unit, a pen holder and a cooperating unit.

DESCRIPTION OF THE PREFERRED EMBODIMENTS

Prior to the explanation of the embodiments of the recorder with the pencil pen which embodies the concept of the present invention, construction and function of a pencil pen used in a prior art recorder are explained with reference to FIGS. 1 and 2A to 2F.

Figure 1:
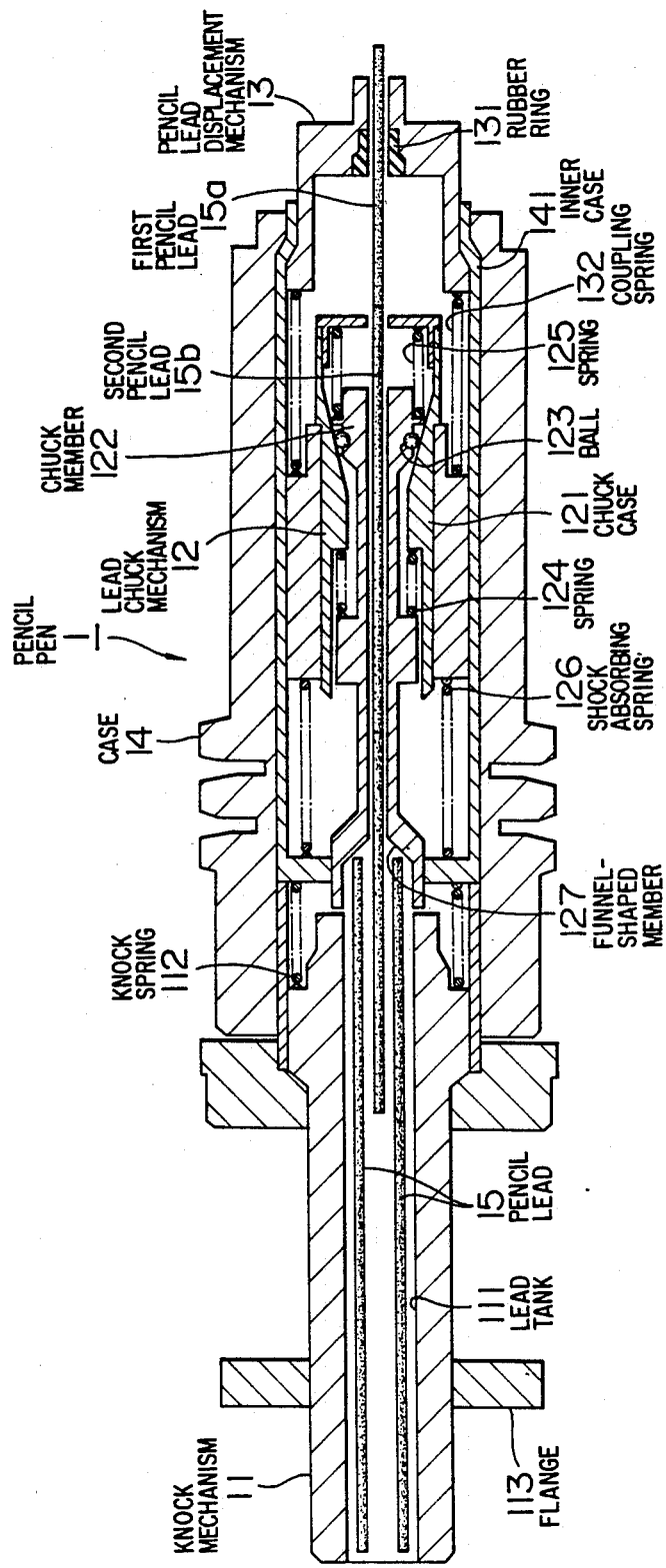
FIG. 1 shows a side sectional view of a known pencil pen used in the recorder and recording method of the present invention.

In FIG. 1, numeral 11 denotes a knock mechanism, numeral 12 denotes a lead chuck mechanism, numeral 13 denotes a pencil lead displacement mechanism, and numeral 14 denotes a case.

The knock mechanism 11 has a lead tank 111 for holding a plurality of pencil leads 15 and a knock spring 112 which couples to a lead chuck mechanism 12 to be explained later.

The lead chuck mechanism 12 has a split chuck member 122, a ball 123 attached to the chuck member 122, a chuck case 121 and two chuck springs 124 and 125. Numeral 126 denotes a shock absorbing spring.

The pencil lead displacement mechanism 13 is formed at an end of the pencil pen 1, and a rubber ring 131 for holding the pencil lead with an appropriate friction is provided at a predetermined position in the pencil lead displacement mechanism.

An inner case 141 positions the lead chuck mechanism 12 at a predetermined position in the pencil pen 1 and holds the pencil lead displacement mechanism 13, which is vertically slidably supported and coupled by a coupling spring 132.

The function is now explained.

The plurality of pencil leads 15 held in the lead tank 111 are taken into a lead path, one at a time, by a funnel-shaped member 127 formed above the lead chuck mechanism 12. The pencil lead 15 taken into the lead path is referred to as a first pencil lead 15a. By vertically moving the knock mechanism 11 one or more times, that is, releasing and holding the chuck member 122, the first pencil lead 15a is held by the chuck member 122 of the lead chuck mechanism 12. The leading end of the first pencil lead 15a normally abuts against the rubber ring 131 of the pencil lead displacement mechanism 13. By vertically moving the pencil lead displacement mechanism 13, the first pencil lead 15a is gradually driven out. More specifically, when the chuck mechanism of the pencil pen holds the pencil lead, it has a relatively weak holding force in a drive-out direction of the pencil lead and a very strong holding force in a drive-back direction of the pencil lead. Accordingly, when the pencil lead displacement mechanism 13 is vertically moved, the first pencil lead 15a is not displaced because it is held by the chuck member 122, and the pencil lead displacement mechanism 13 changes the position relative to the first pencil lead 15a. When the pencil lead displacement mechanism 13 returns to the initial position, the first pencil lead 15a is driven out by a friction of the rubber ring 131 by a distance of vertical stroke.

When the first pencil lead 15a goes out of the leading end of the pencil pen 1, it can record data. As the pencil lead, 15a is consumed as the recording is done and the tail end of the pencil leads 15a leaves the lead chuck mechanism 12, the recording is no longer carried out. In this case, the first pencil lead 15a must be removed.

In the lead chuck mechanism 12 of the pencil pen 1 of the prior art apparatus, since the hold/release operation is carried out at a fixed position in order to maintain a high record quality, the lead chuck mechanism 12 itself has no function to drive out the pencil lead 15. Accordingly, when the first pencil lead 15a has been consumed and left the lead chuck mechanism and the second pencil lead 15b follows and the knock mechanism 11 is operated while the second pencil leads 15b is held by the lead chuck mechanism 12, the first pencil lead 15a cannot be removed. The first pencil lead 15a is held by the rubber ring 131 of the pencil lead displacement mechanism 13 by a predetermined frictional force.

It is now assumed that the first pencil lead 15a and the second pencil lead 15b are in a condition as shown in FIG. 1, that is, the first pencil lead 15a has left the lead chuck mechanism 12 and the second pencil lead 15b contacts to the trailing edge of the first pencil lead 15a. The pencil lead displacement mechanism 13 is pushed up by a predetermined amount against the coupling spring 132. As the pencil lead displacement mechanism 13 is raised, the first pencil lead 15a held by the frictional force of the rubber ring 131 tends to be raised by a predetermined amount. However, since the second pencil lead 15b which contacts to the trailing edge of the first pencil lead 15a is held by the lead chuck mechanism 12, the first pencil lead 15a is not raised but stays at the current position. As a result, the first pencil lead 15a is advanced relative to the pencil lead displacement mechanism 13. When the pencil lead displacement mechanism 13 is then returned to the initial position, a gap of a predetermined amount (corresponding to the rise of the pencil lead displacement mechanism 13) is created between the trailing edge of the first pencil lead 15a and the second pencil lead 15b. The knock mechanism 11 is then depressed. The lead chuck mechanism 12 is released and the second pencil lead 15b drops by a gravity to contact to the trailing edge of the first pencil lead 15a. By alternately repeating the above two operations, that is, pushing up of the pencil lead displacement mechanism 13 and the depression of the knock mechanism 11, the first pencil lead 15a can be removed.

FIGS. 2A to 2F show recording conditions when the pencil pen 1 is mounted on the recorder for recording. In FIGS. 2A to 2F, the pencil pen 1 shown in FIG. 1 is shown in a simplified form. Numeral 719 denotes a stopper provided in an automatic drafting machine, and numeral 73 denotes a record surface.

In FIGS. 2A to 2F, in an initial condition, the pencil pen 1 is in an up position, that is, the pencil lead displacement mechanism 13 is not pushed up (FIG. 2A), and the pencil lead 15 is not contacted to the record surface 73.

Figure 2A:
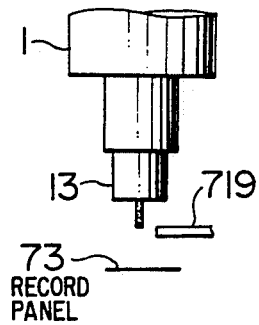
FIGS. 2A to 2F show a time-sequential relationship between a pencil lead and a record panel in a recording process by a known recorder with the pencil pen shown in FIG. 1.
Figure 2B:
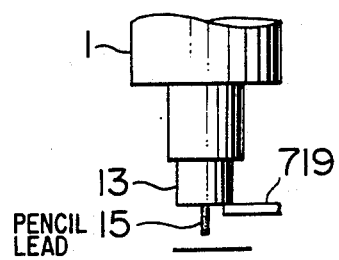
Figure 2C:
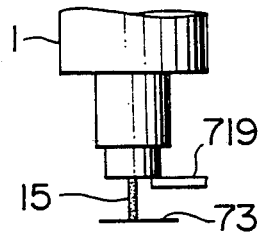
Figure 2D:
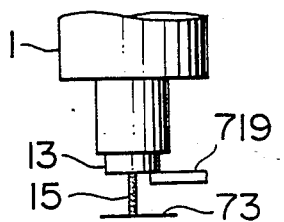

In a normal state, the pencil pen 1 is in an up state as shown in FIG. 2A. When the pencil pen 1 is moved down by a pen move-down command, the pencil lead displacement mechanism 13 abuts against the stopper 719 (FIG. 2B). As the pencil pen 1 is further moved down, the pencil lead displacement mechanism 13 is in the push-up state as shown in FIG. 1 so that the pencil lead 15 is driven out. As the pencil pen 1 is further moved down, the leading and of the pencil lead 15 abuts against the record panel 73 (FIG. 2C). Then, record is made on a record sheet (not shown) mounted on the record panel 73. As the pencil lead 15 is abraded during the recording, the pencil pen 1 is moved down as shown in FIG. 2D by a draw pressure force (downward biasing force) of an actuator (not shown) of the pencil pen 1 so that the recording is continued.

Figure 2E:
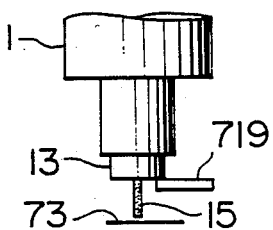
Figure 2F:
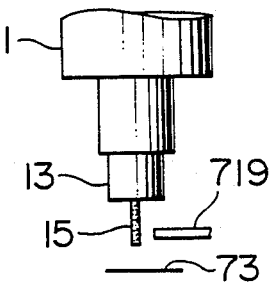

At the end of the recording, when the pencil pen 1 is moved up, the pencil lead displacement mechanism 13 is gradually driven out as shown in FIG. 2E. Referring to FIG. 1, the pencil lead displacement mechanism 13 advances from the position embedded into the pencil pen 1. At the end of the moving-up of FIG. 2F, the pencil lead displacement mechanism 13 is moved downward to the initial position and and the pencil lead 15 for the next recording is driven out.

Figure 3:
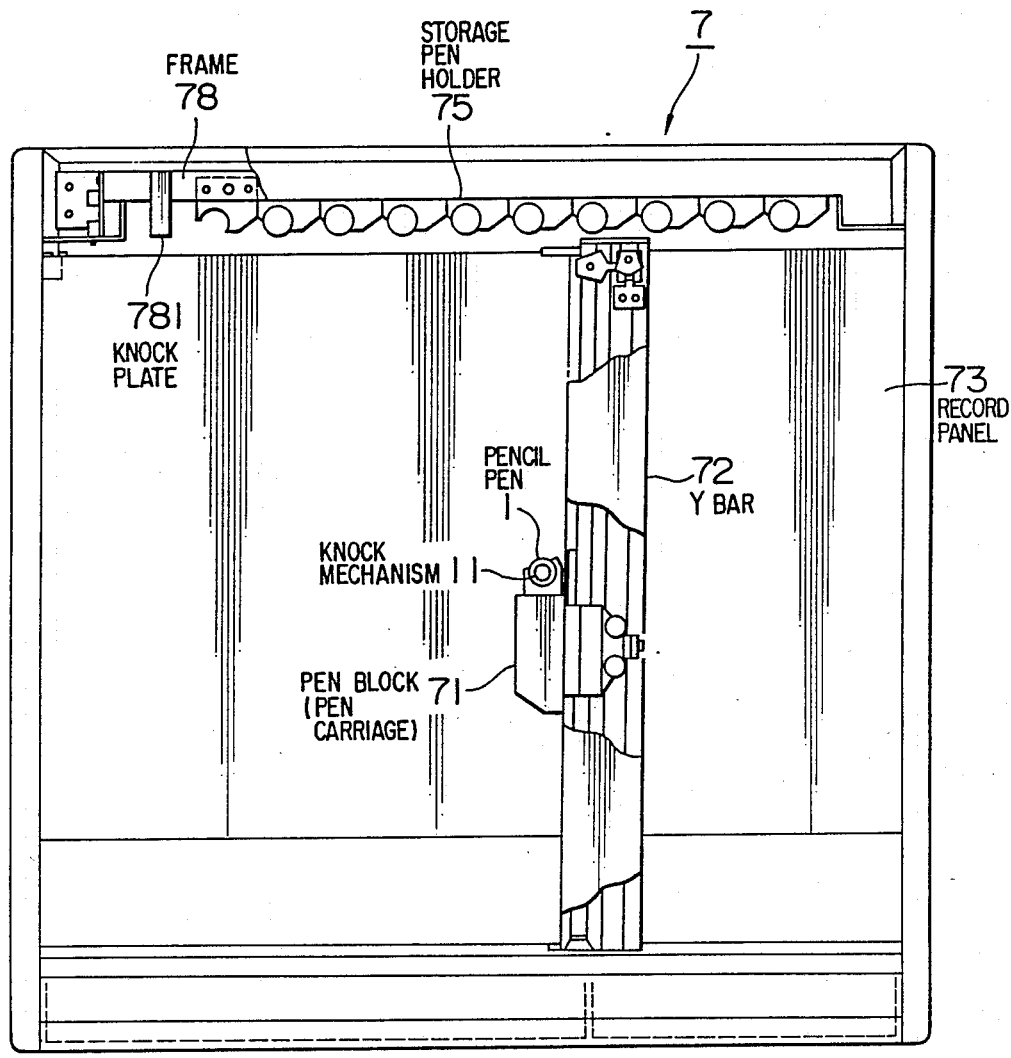
Figure 4:
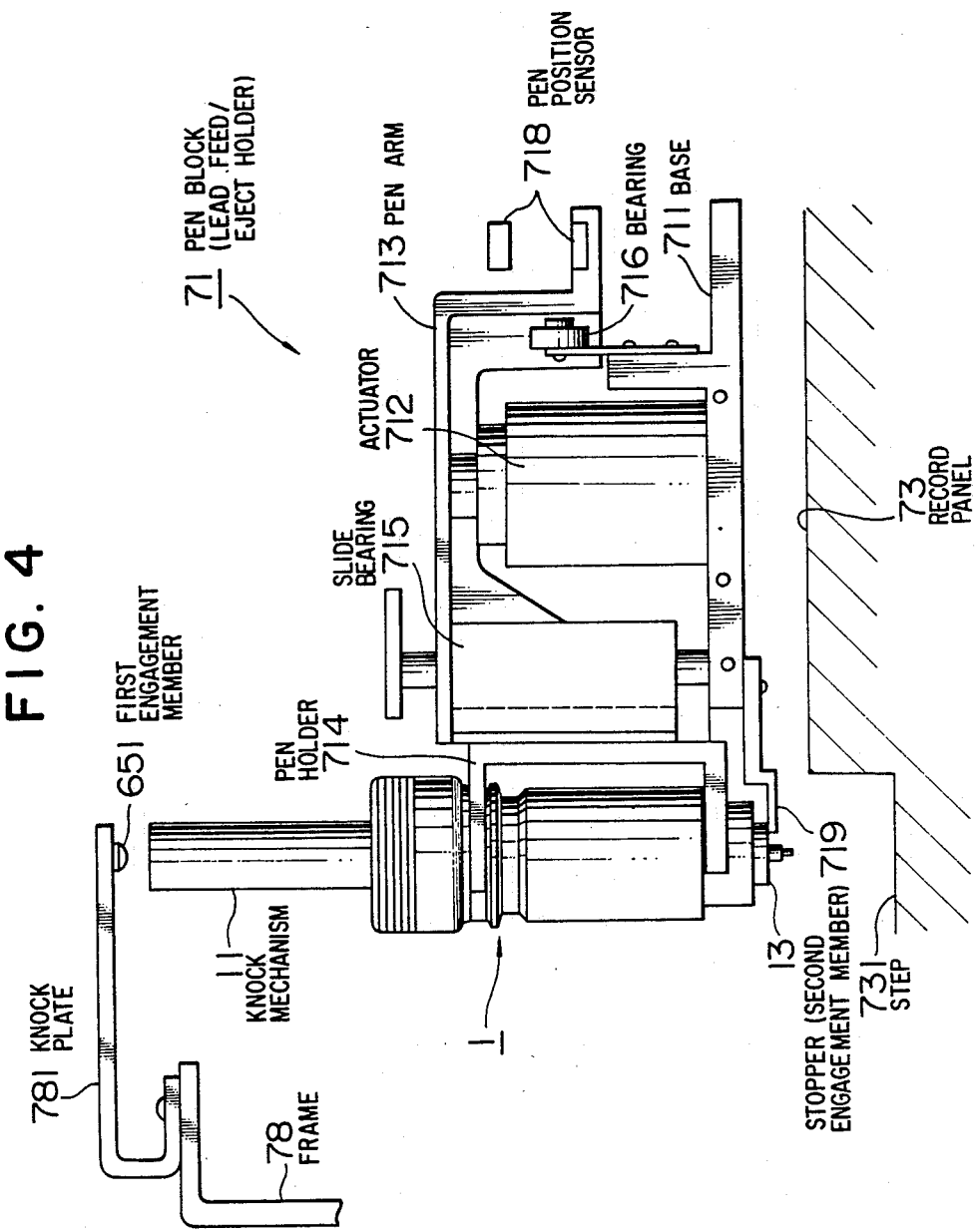

Referring to FIGS. 3 and 4, a first embodiment of the present invention is explained.

In FIG. 3, numeral 7 denotes a recorder, numeral 71 denotes a pen block or pen carriage, numeral 72 denotes a Y-bar, numeral 73 denotes a record panel, and numeral 75 denotes a container pen holder. The pen block 71 is supported by the Y-bar 72 and movable on the record panel 73. A record pen such as a pencil pen 1 is held by the pen block 71, and records a data signal supplied from a CPU (not shown) at coordinates on the record panel designated by the data signal under the control of a control signal a plurality of record pens are stored in the container pen holder 75. When a lead of a current pencil pen has been consumed, it is exchanged with a spare one. Alternatively, other type of record pen than the currently used pencil pen, that is, a pencil pen of different color or a ball-point pen may be used as the record pen. A knock plate 781 is formed on a frame 78 of the container pen holder 751 to actuate the knock mechanism 11 of the pencil pen 1.

FIG. 4 shows major portions of the first embodiment. The function of the knock plate 781 to the pencil pen 1 is first explained and then the operation of the embodiment is explained.

The pen block 71 comprises a base 711, an actuator 712, a pen arm 713, a pen holder 714, a slide bearing 715, a bearing 716 and the stopper 719 shown in FIGS. 2A to 2F. The stopper 719 also functions as a second engagement member 652 which abuts against the pencil lead displacement mechanism 13 to move it up and down. The pen holder 714 holds the pencil pen 1 and is vertically driven through the pen arm 713 in response to energization and deenergization of an electro-mechanical actuator 712 having a solenoid. The second engagement member 719 provided below the pen block 71 abuts against the pencil lead displacement mechanism 13 of the pencil pen 1 to vertically drive the pencil lead displacement mechanism 13 as the pen holder 714 is vertically driven.

Let us assume that the pencil lead 15 of the pencil pen 1 is to be removed. The pen block 71 supported by the Y-bar 72 moves the pencil pen 1 to a predetermined position on the recorder by a data signal from the CPU, and causes the knock mechanism of the pencil pen 1 to abut against the first engagement member 651 formed on the knock plate 781. In the present embodiment, when the pencil pen 1 is to be positioned to a predetermined position by the data signal, an input signal is applied to the actuator 712 corresponding to a signal intermediate of actuation signal and deactuation signal so that the pencil pen 1 is held at an up position and a down position. Accordingly, when the pencil pen 1 is to be moved, no control signal for operation is applied to the knock mechanism of the pencil pen 1 and the pencil lead displacement mechanism 13. As the pencil pen 1 is position to the predetermined position, a control signal is applied to the electro-mechanical actuator 712 to first move down the pencil pen 1 and the move it up. This corresponds to the vertical movement of the pencil lead displacement mechanism 13 shown in FIG. 1 and the vertical movement of the knock mechanism 11, that is, holding and releasing of the lead chuck mechanism 12. By alternately repeating those two vertical movements, unnecessary pencil lead 15 can be removed from the pencil pen 1 held by the pen holder 714. A step 731 of FIG. 4 serves to drop the unnecessary pencil lead 15 ejected from the pencil pen 1.

Figure 5:
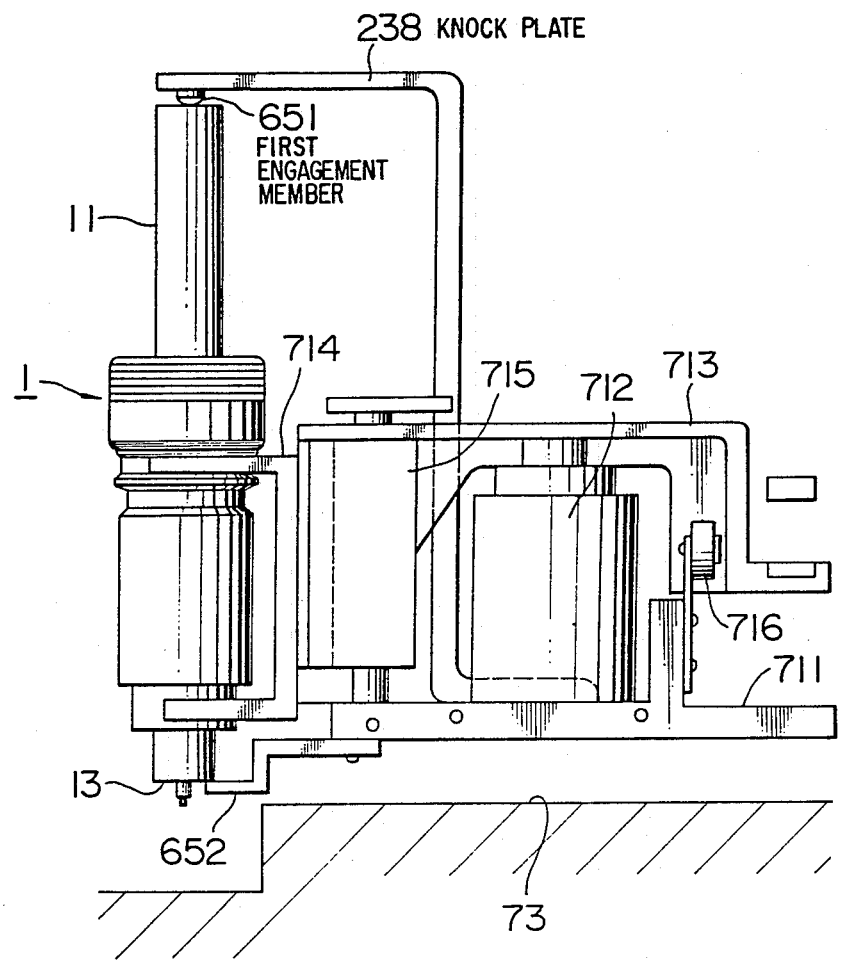
FIG. 5 shows a side view of a pen block which serves as the lead feed and eject means and a cooperating unit in second embodiment.

Referring to FIG. 5, a second embodiment of the present invention is explained.

A recorder of the second embodiment shown in FIG. 5 is substantially identical in construction to the first embodiment of FIG. 4, except that it is a knock plate 238 mounted on a base 711 of the pen block 23 that a first engagement member 651 abutting against the knock mechanism 11 of the pencil pen 1 is mounted on unlike the first embodiment in which it is mounted on the knock plate mounted on the frame of the recorder. In the second embodiment, the pen up-position for normal recording operation of the recorder is lower than a highest possible position of the pencil pen. The knock mechanism 11 of the pencil pen 1 is not pushed down by the knock plate 238 by the move-up operation of the pencil pen in the normal recording.

In the second embodiment, the operation to remove the unnecessary pencil lead is essentially identical to that of FIG. 4 and the explanation thereof is omitted.

Figure 6:
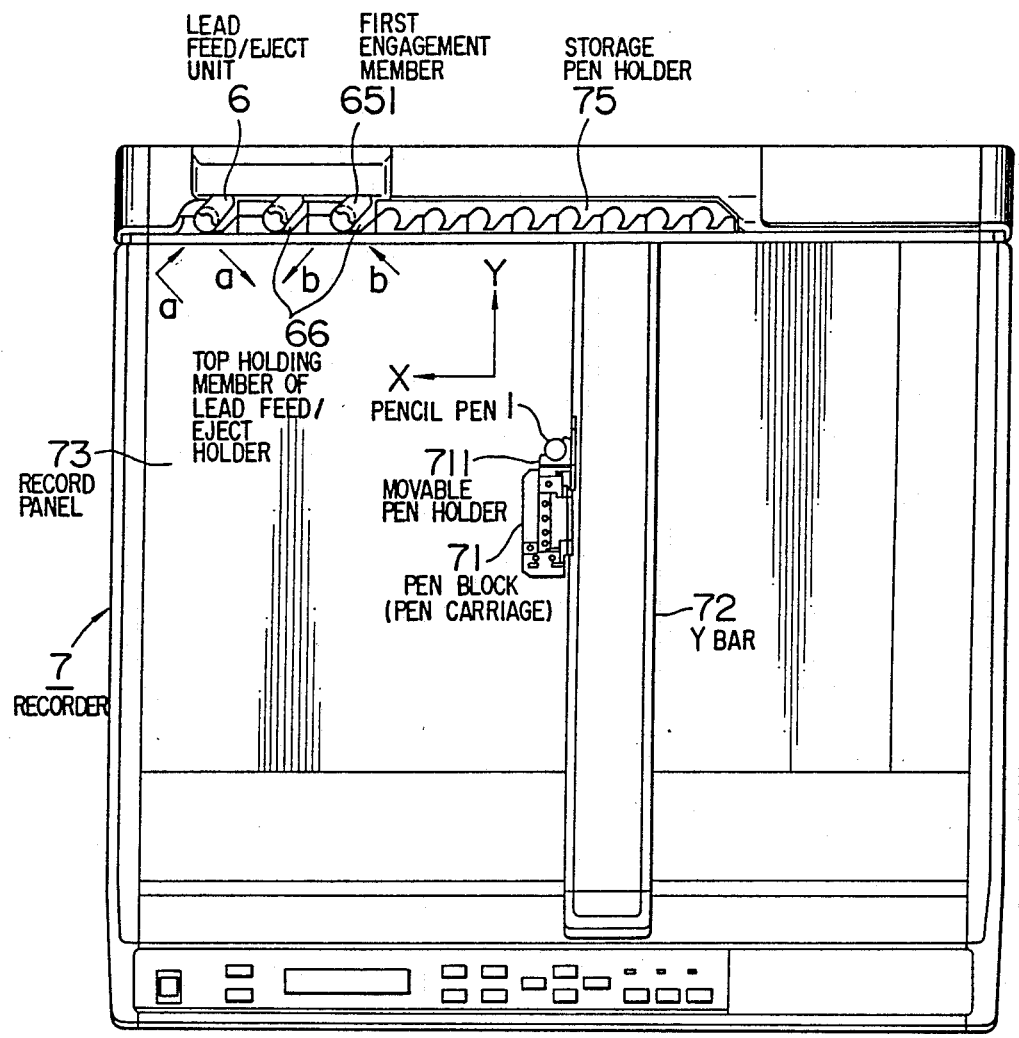

A third embodiment of the recorder of the present embodiment is shown in FIGS. 6 and 7.

In FIG. 6, numeral 7 denotes a recorder, numeral 71 denotes a pen block, numeral 72 denotes a Y-bar, numeral 73 denotes a record panel, numeral 66 denotes a lead feed/eject holder which is one component of a lead feed/eject unit 6, and numeral 75 denotes a container pen holder formed on one side edge of the record panel. The pen block 71 is supported by the Y-bar 72 and movable on the record panel 73 in X and Y directions is accordance with a data signal from a CPU (not shown). The movable pen holder 711 of the pen block 71 holds the pencil pen 1 and it contacts or moves away from the record panel in accordance with the control signal from the CPU to record data, as is done in the previous embodiments. The container pen holder 75 stores a plurality of record pens of the same or different types and they are exchangeably used as required. The lead feed/eject holder 66 is formed adjacently to the storage pen holder 75. By moving the pencil pen 1 in a direction a, it may be held by one of the lead feed/eject holders 66. By moving the pencil pen 1 in a direction b, the pencil pen 1 which is held by the lead feed/eject holder 66 can be taken out. By a relative movement between the lead feed/eject holder 66 and the movable pen holder 711, the pencil pen 1 is exchanged between the lead feed/eject holder 66 and the movable pen holder 711. This operation is similar to a conventional pen exchange operation and may be carried out by using technical means disclosed in JP-B-59-400(corresponding to U.S. Pat. No. 4,401,996).

FIG. 7 illustrates or operation of the lead feed/eject holder 6 and shows a side view.

The lead feed/eject holder 6 shown in FIG. 7 has a lead eject holder base 61. A holder frame 611 is mounted on the base 61 and a right portion thereof forms a lead feed/eject holder 66. A solenoid 64 is mounted at a predetermined position on the frame 611 and a movable member 65 couples to an action shaft 641 of the solenoid 64. The movable member 65 is supported such that it is vertically movable against a spring 654 along a slide shaft 653 mounted on the frame 611. A push-down member 656 is integrally formed with a lowermost portion of the movable member 65, and it engages with a push-down rod 712 formed on the pen block 71 to push down the movable member 65. The movable member 65 has first engagement member 651 and second engagement member 652 fixed at top and bottom thereof. When the pencil pen 1 is held by the pen holder 66 of the frame 611, the first engagement member 651 functions to release the knock mechanism 12, and the second engagement member 652 abuts against the pencil lead displacement mechanism 13 to push it up.

In the present apparatus, a residual lead processing unit 69 is provided at the bottom of the lead feed/eject unit 6. The residual lead processing unit 69 includes a residual lead receptacle 691 which is removable from the apparatus, a sensor mounting plate 671 mounted to the lead eject holder base 61 and a positioning member 692 for positioning a sensor 67 and the residual lead receptacle 691. Instead of using the residual lead receptacle 691 which is removable from the apparatus, one end of the residual lead receptacle 691 may be rotatably engaged to the apparatus so that it is rotated by 180 degrees to eject the residual lead from the recorder.

As shown in FIG. 7, as the pencil pen 1 held by the movable pen holder 711 of the pen block 71 is consumed so that it can no longer create sharp record, the lead ejection operation is started by a command signal from an internal electric circuit (not shown) of the recorder. The pen block 71 is moved in a direction a shown in FIG. 6 to hold the pencil pen 1 by one pen holder 66 of the lead feed/eject unit 6. A push-down member 656 formed on a movable member 65 of the lead feed/eject unit 6 is pushed down by a push-down rod 712 formed in the pen block 71. When the pen block 71 is retracted, the second engagement member 652 abuts against the pencil lead displacement mechanism 13 of the pencil pen 1 so that it pushes up the pencil lead displacement mechanism 13 by an upward biasing force of the spring 654. The first engagement member 651 is now positioned at a position which permits abutment against the flange 113 of the knock mechanism 11 of the pencil pen 1.

Under this condition, the solenoid 64 is energized and deenergized a predetermined number of times. Thus, the movable member 65 is vertically displaced the predetermined number of times. Thus, as explained above in connection with FIG. 1, the residual lead of the pencil pen 1 is removed by the coaction of the flange 113 of the pencil pen 1 and the first engagement member 651 and the coaction of the pencil lead displacement mechanism 113 and the second engagement member 652.

As the residual lead is ejected from the pencil pen 1 in this manner, the residual lead passes through a residual lead drop hole 693 and is detected by the sensor 67. The detection signal is sent to the internal electric circuit and the lead ejection operation is terminated.

As seen from FIG. 1 which shows a known pencil pen, the next pencil lead is now drive out to the leading edge of the pencil pen 1. Accordingly, the record operation can be immediately started.

The residual lead is stored in the residual lead receptacle.

A fourth embodiment of the recorder of the present invention is now explained with reference to FIGS. 8A, 8B, 9 and 10.

Figure 8A:
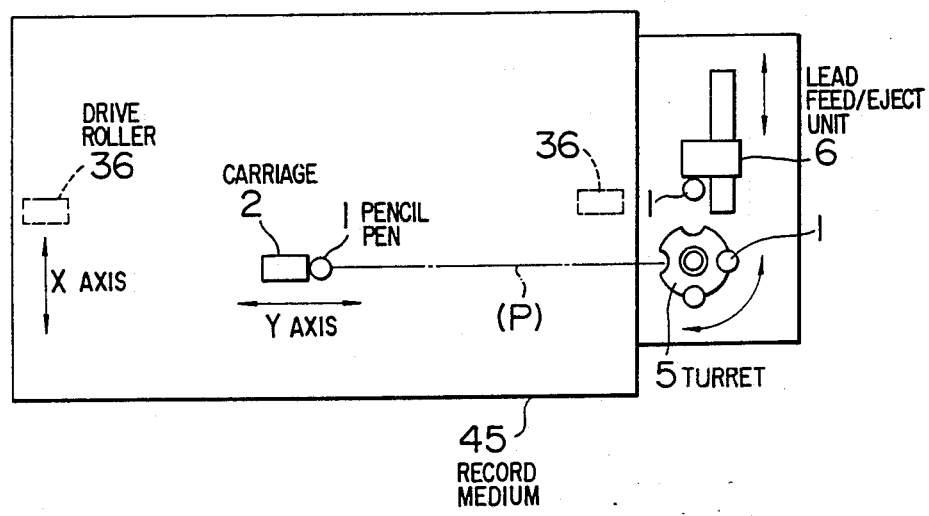
Figure 8B:
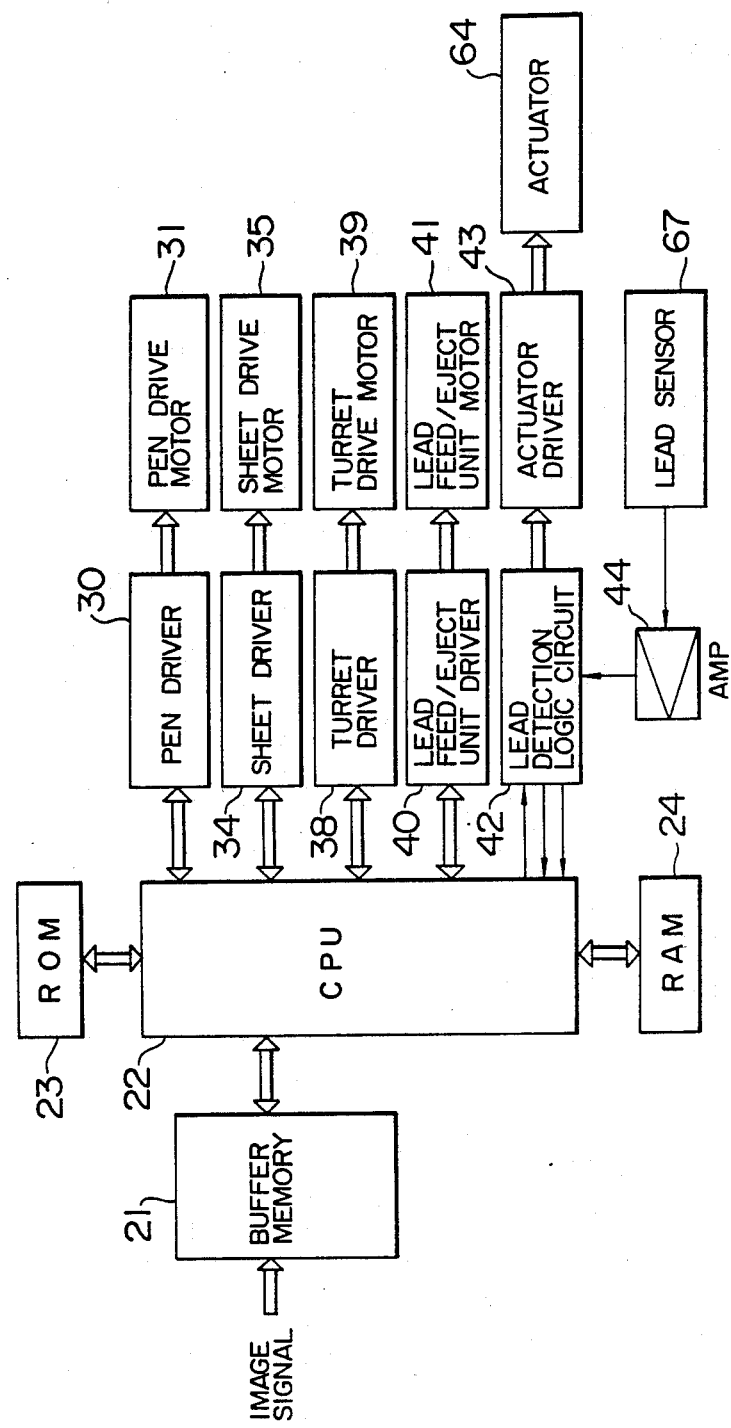

FIG. 8A shows a mechanical system of the present embodiment and FIG. 8B shows an electrical system thereof. As shown in FIGS. 8A and 8B, in the present embodiment of the recorder, a record medium 45 is moved in an X-axis direction and a carriage 2 is moved in a Y-axis direction to draw a desired drawing. The record medium 45 is moved by a drive roller 36 and a pinch roller (not shown) and controlled by a CPU through a sheet driver 34 and a sheet drive motor 35. The carriage 2 is controlled by the CPU through, a pen driver 30 and a pen drive motor 31. A turret 5 for holding a plurality of record pens is provided at a predetermined position so that it cooperates with the movable pen holder of the carriage 2 to permit exchange of the record pens. The turret 5 is rotated to allow take-out of a desired one of the plurality of record pen. It is also controlled by the CPU through a, turret driver 38 and a turret drive motor 39. Such a pen exchange unit is disclosed in Japanese Utility Model Application Laid-Open No. 58-154,422.

The recorder is provided with a lead feed/eject unit 6 to permit the use of the pencil pen 1 as shown in FIG. 1. The lead feed/eject unit 6 of the present embodiment cooperates with the turret 5. The lead feed/eject unit 6 is controlled by the CPU through a lead feed/eject unit driver 40 and a lead feed/eject unit motor 41 so that it cooperates with the turret 5 to move relative to the turret 5 to take in the pencil pen 1 whose lead is to be fed or ejected. This operation may also use the same technique as that of the pen exchange operation described above.

Figure 9:
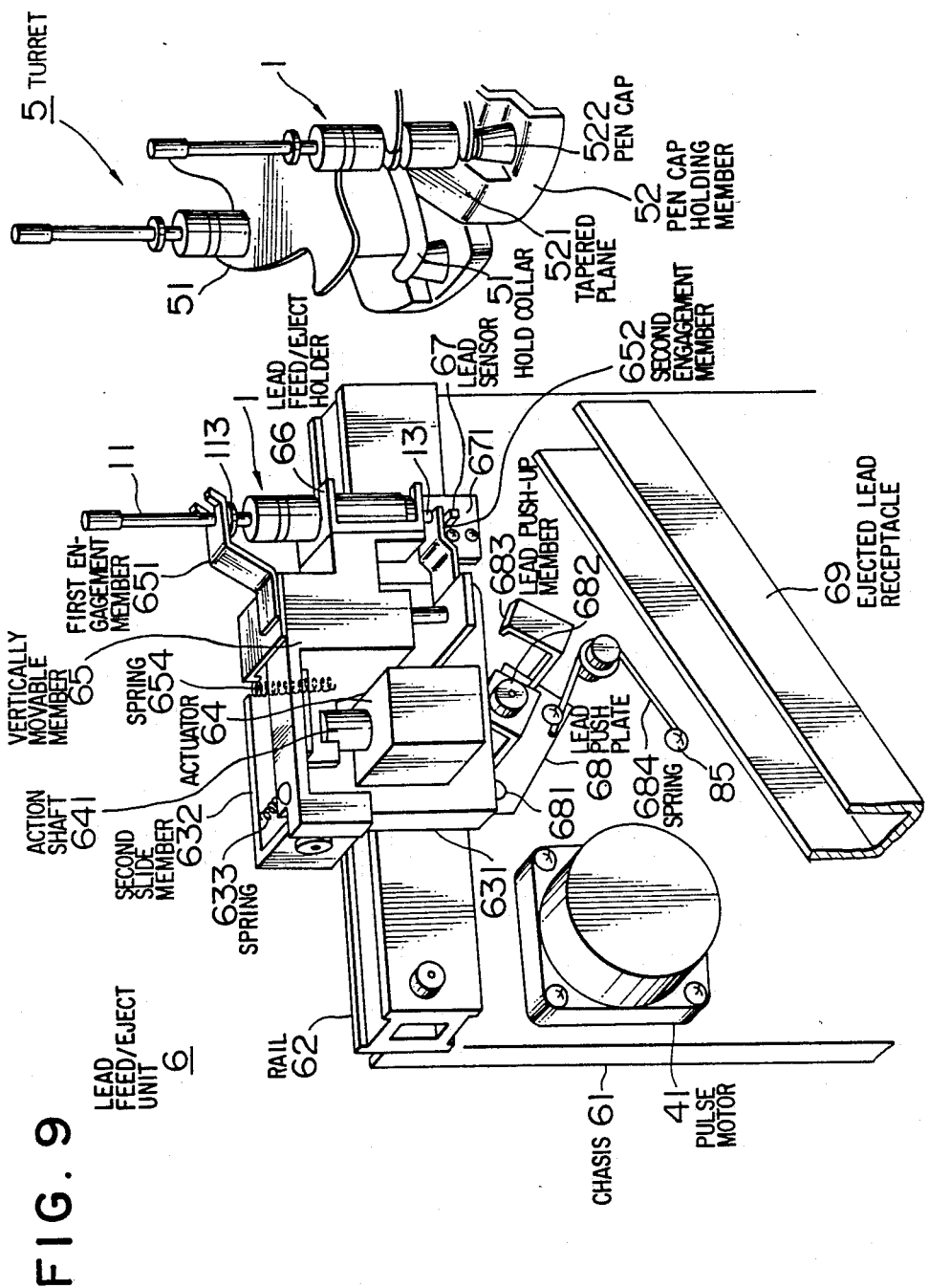

Referring to FIG. 9, the lead feed/eject unit 6 is explained.

The lead feed/eject unit 6 shown in FIG. 9 is essentially identical to that shown in FIG. 7.

The pencil pen 1 whose lead is to be fed or ejected is taken from the turret 5 into the pen holder 66 of the lead feed/eject unit 6, and the movable member 65 having the pen holder 66 is vertically moved by the solenoid 64 of the lead feed/eject unit 6. Since the pencil pen 1 is vertically moved by the vertically moving pen holder 66, the knock mechanism 11 and the pencil lead displacement mechanism 13 abut against the first engagement member 651 and the second engagement member 652, respectively, fixed at the predetermined positions on the lead feed/eject unit 6. As a result, the hold-/release operation of the lead chuck mechanism 12 through the knock mechanism 11 and the vertical movement of the pencil lead displacement mechanism 13 are alternately carried out.

The lead feed/eject unit 6 has a first slide member 631 and a second slide member 632 which slide along a rail 62 mounted on a chassis 61 of the recorder. The second slide member 632 is arranged above the rail 62, and a plurality of rollers (not shown) mounted on the second slide member 632 slide on a groove formed on a top surface of the rail 62. The first slide member 631 has an upper portion thereof coupled to the second slide member 632 and is arranged along a side wall of the rail 62. An actuator 64 is mounted at a predetermined position on the first slide member 631 and an action axis 641 thereof is coupled to a vertically movable member 65. A pen holder 66 for holding the pencil pen 1 whose lead is to be fed or ejected is provided at a right end of the vertically movable member 65. Accordingly, the pencil pen 1 whose lead is to be fed or ejected is vertically moved through the vertically movable member 65 and the pen holder 66 by energizing the actuator 64. The vertically movable member 65 and the second slide member 632 are coupled by spring 6654. Thus, when the actuator 64 is energized, the vertically movable member 65 and hence the pencil pen 1 are moved downward, and when the actuator 64 is deenergized, the vertically movable member 65 and hence the pencil pen 1 are moved upward by the spring 654. The vertically movable member 65 and the second slide member 632 are coupled by another spring 633. The spring 733 causes the left end of the vertically movable member 65 to abut against the roller of the second slide member 632 to prevent rotation of the vertically movable member 65 when it is vertically moved.

A second engagement member 652 is provided on a bottom surface of a projection (an abutment of a slide shaft of the vertically movable member 65) at the lower portion of the first slide member 631 and it abuts against the pencil lead displacement mechanism 13 of the pencil pen 1. A first engagement member 651 is provided at a top right portion of the second slide member 632. It is abuttable against a flange 113 of the knock mechanism 11 of the pencil pen 1.

A sensor mounting plate 671 is provided at a right bottom portion of the first slide member 631 to detect an ejected pencil lead or namely driven pencil lead. The lead feed/eject unit 6 is slid by a pulse motor 41 through a transmission member (not shown) provided on the opposite side of the chassis 61.

If the CPU of the recorder detects absence of lead for the pencil pen 1 under recording, the drafting cannot be continued and the CPU issues a command signal to the pen drive 30 and the turret driver 38 to store the pencil pen 1 which cannot record, into the turret 5. Another record pen held in the turret 5 may be taken in to draft the same or other drawing.

The pencil pen 1 which cannot record and is held in the turret 5 is removed into the pen holder 66 of the lead feed/eject unit 6 by the turret driver 38 and the lead feed/eject unit driver 40 in response to the command signal from the CPU. The hold operation is carried out by the lead feed/eject unit 6 which cooperate with the turret 5 to move itself by a predetermined distance rightward in FIG. 9 by the pulse motor 41. The turret 5 has a hold collar 51 comprising a plurality of recesses for a plural of pencil pens, respectively, at the upper portion thereof, and also has a plurality of pen cap holding members 52 at the lower portion. Each of the pen cap holding members 52 has a tapered plane and a flat plane supporting a pen cap adaptable to receive the tip of a pencil pen. In operation, the tapered plane 521 of the pen cap holding member 52 is pressed down by a member (not shown) which acts in accordance with the movement of the lead feed/eject unit 6.

When the lead feed/eject unit 6 which has take the unrecordable pencil pen 1 therein retracts to a position shown in FIG. 9, an electro-mechanical actuator (for example, solenoid) 64 is energized and deenergized by the actuator driver 43 in response to the command signal from the CPU so that the lead is fed or ejected. The ejected pencil lead is detected by the lead sensor 67. The sensor 67 also detects whether a new pencil lead is driven out. The sensor signal is sent to a lead detection logic circuit 4 through an amplifier 44. The circuit 4 display "no lead" or "end of lead feed" on display means (not shown).

Figure 10:
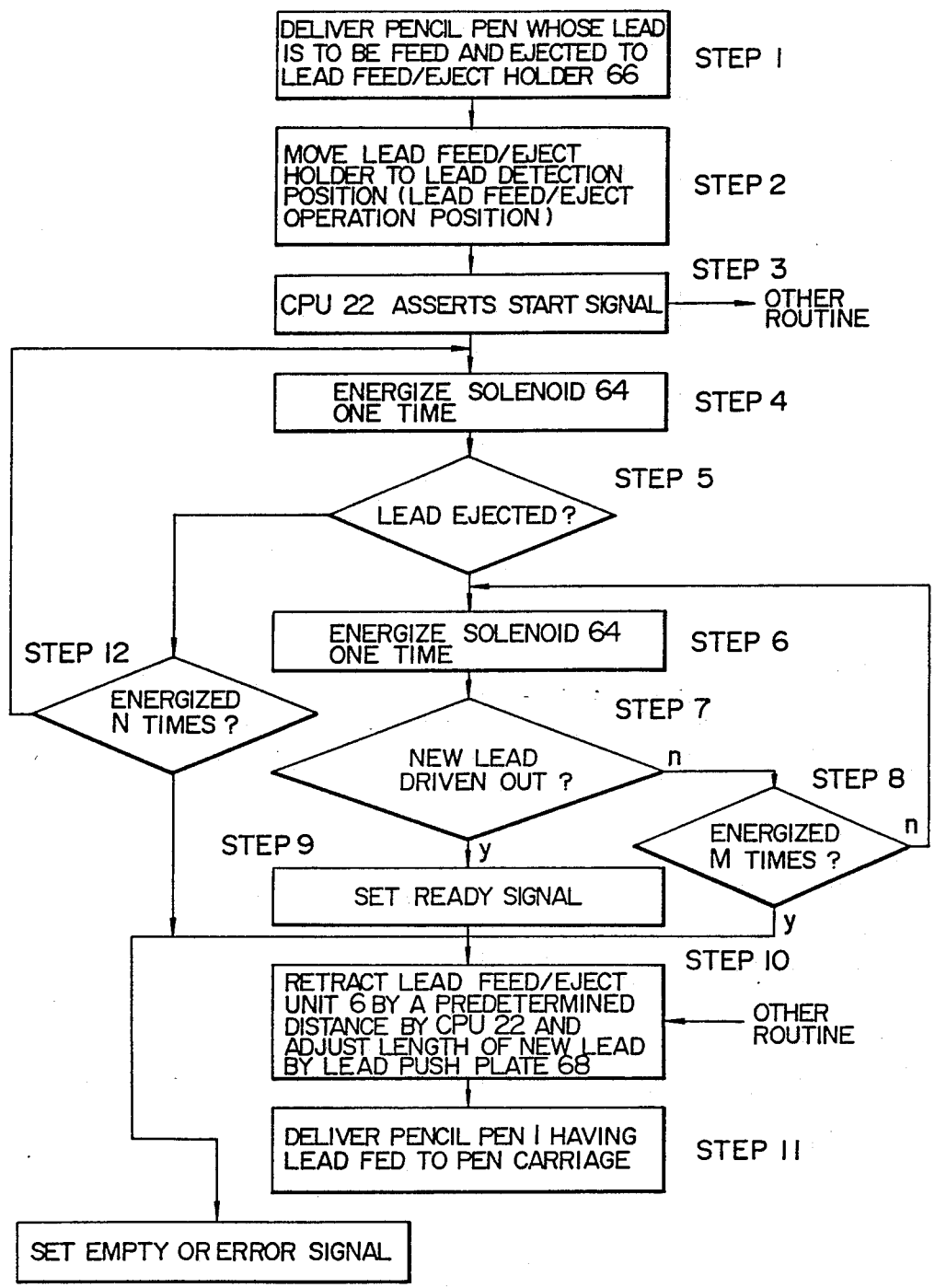

As the new pencil lead is driven out, the lead feed-/eject unit 6 retracts by a predetermined distance to engage with a lead push-up member 683 which is biased upward by a spring 684. One end of the lead push-up member 683 is rotatably supported by the chassis 61 by a screw 681. A bearing 682 is mounted at a top of the lead push-up member 683 and slides on the bottom surface of the first slide member 631 of the lead feed-/eject unit 6. The bottom surface is tapered at a position close to the lead feed/eject pen holder 66. Accordingly, when the lead feed/eject unit 6 retracts by the predetermined distance, the lead push-up member 683 is pushed up by the biasing force of the spring 684 to push back the lead of the pencil pen 1 which has been driven out, into the pencil pen 1. The solenoid 64 of the lead feed-/eject unit 6 is now deenergized and the lead chuck mechanism 12 of the pencil pen 1 is released. Thus, the pencil pen can be readily pushed back into the pencil pen 1 to adjust the lead length. FIG. 10 shows an operational flow diagram for explaining the series of operations described above.

In an step 1, the non-recordable pencil pen 1 whose lead has been consumed is held in the pen holder 66 of the lead feed/eject unit 6 under the control of the CPU 22.

Then, the lead feed/eject unit 6 is moved backward or leftward in FIG. 10 by the pulse motor 41 under the control of the CPU 22 as shown in FIG. 9 so that it is positioned at the lead feed/eject position (step 2).

Under this condition, the CPU 22 issues a start signal to the logic circuit which includes the lead detection logic circuit 42 shown in FIG. 8B to shift the control of operation to the logic circuit. In the present embodiment, the CPU 22 starts another operation from this time point (step 3).

The step 4 et seq are carried out by commands from the logic circuit. In the step 4, the lead feed/eject actuator (solenoid) 64 shown in FIG. 9 is energized once, that is, the lead chuck mechanism 12 (see FIG. 1) of the pencil pen 1 held by the lead feed/eject holder 66 is held and released once and the pencil lead displacement mechanism 13 is vertically moved once.

In a step 5, the lead sensor 67 shown in FIG. 9 starts to detect whether unnecessary residual lead has been ejected or not. In the step 5, if the ejection of lead is not detected, the process proceeds to a step 12. In the step 12, whether the solenoid 64 has been energized N (predetermined number) times or not. If N times is not reached, the process returns to the step 4.

If N times is reached that is, if the ejection of lead is not detected after N times of energization of the solenoid 64, the process proceeds to a step 13 to set an error signal.

In the step 5, if the ejection of unnecessary residual lead is detected, the process proceeds to a step 6 where the solenoid 64 is energized once. In a step 7, the lead sensor 67 detects whether a new pencil lead has been driven out in the step 6 or not. If the drive-out of the new lead pencil is not detected in the step 7, the process proceeds to a step 8 where whether the solenoid 64 has been energized M (predetermined number which may be equal to N) times or not is checked. If M times is not reached, the process returns to the step 6. When the new pencil lead is not driven out after M times of energization, the process proceeds to a step 13 to set an empty signal.

In the step 7, if the lead sensor 67 detects the drive-out of the new pencil lead, the process proceeds to a step 9. In the step 9, a ready signal is set to inform to the CPU 22 that the lead feed/eject operation by the logic circuit which controls the lead feed/eject operation has been completed. The subsequent operation is carried out under the control of the CPU 22.

In a step 10, the lead feed/eject unit 6 is moved backward or leftward in FIG. 9 by the predetermined distance by a signal from the CPU 22 and the driven-out pencil lead is adjusted to a predetermined length by the lead push-up member 683 as shown in FIG. 9.

In a step 11, the pencil pen 1 having the lead thereof fed is held by the pen carriage 2 through the turret 5 so that the recorder is ready for recording.

Finally, a fifth embodiment of the recorder of the present invention is explained with reference to FIGS. 11A, 11B and 12.

Figure 11B:
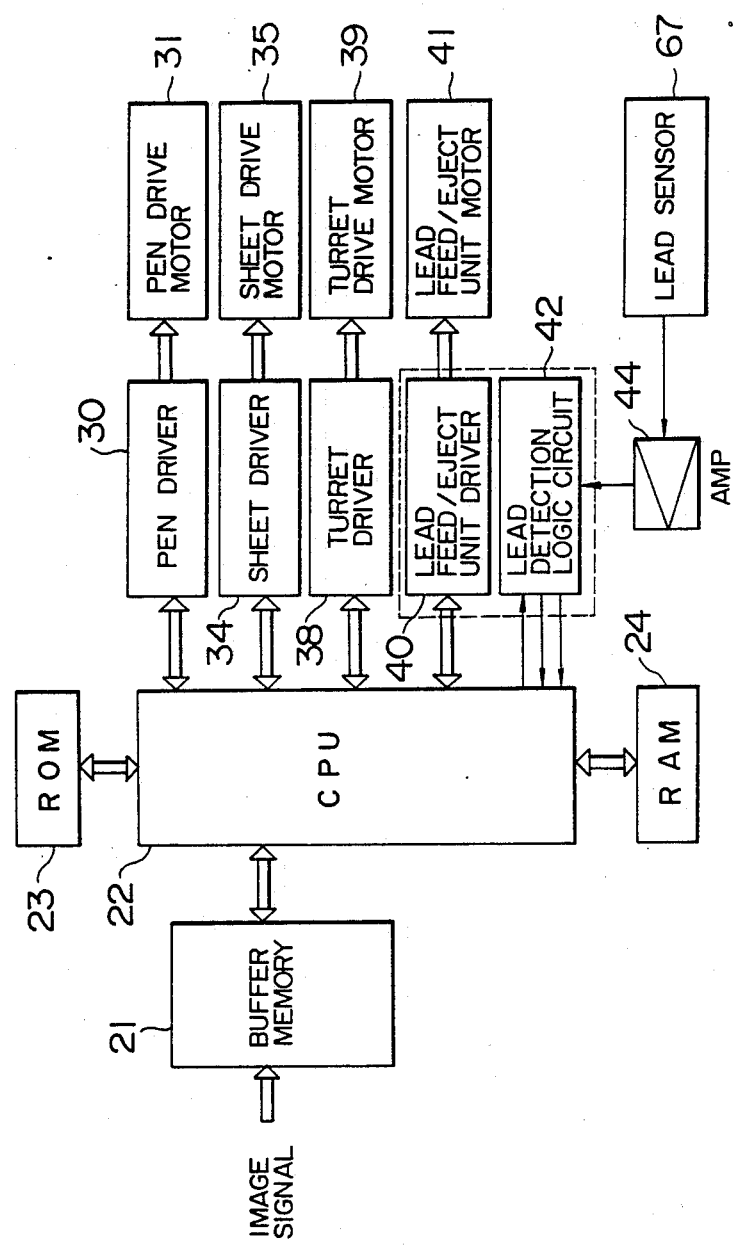
Figure 12:
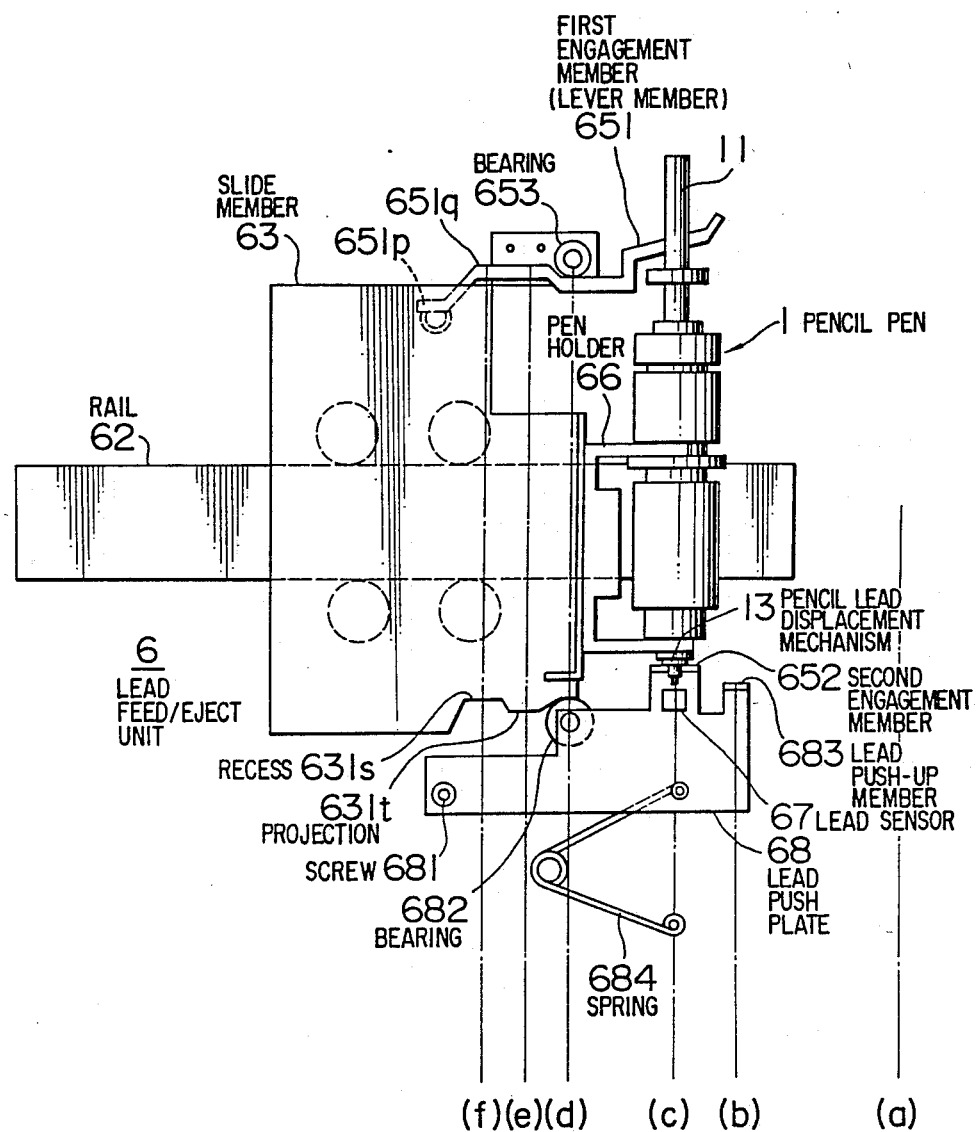

The fifth embodiment shown in FIGS. 11A, 11B and 12 is substantially identical to the fourth embodiment shown in FIGS. 8A, 8B, 9 and 10 a record medium 45 moves in an X-axis direction and a carriage 2 for holding a pencil pen 1 moves in a Y-axis direction. It differs from the previous embodiment in that the lead feed-/eject operation is attained without the electromechanical actuator 64 of the lead feed/eject unit 6. Only the difference is explained below with reference to FIG. 12.

A pen holder 66 of the lead feed/eject unit 6 is mounted on a slide member 63 which is slid along a rail 62 by a pulse motor (not shown). The slide member 63 has a first engagement member 651 mode of a lever member which engages with a flange (not shown) of a knock mechanism 11 when the pencil pen 1 is held by the pen holder 66. The first engagement member 651 has a raised area 651q behind the center thereof, and a rear end 651p thereof is rotatably held by the slide member 63. In the rear end 618, the first engagement member 651 is always biased upward by a coiled spring (not shown). A bearing 653 fixed to a chassis (not shown) engages to the raised area 651q of the first engagement member 651. Accordingly, as the slide member 63 moves back and forth to engage and disengage the raised area 651q and the bearing 653, the knock mechanism 11 of the pencil pen 1 is vertically moved or the lead chuck mechanism 12 is held and released.

On the other hand, a lead push plate 68 having a second engagement member 652 which abuts against a pencil lead displacement mechanism 13 of the pencil pen 1 is rotatably mounted on the chassis by a screw 681, and it is biased upward by a spring 684. One end of the spring 684 is fixed to the lead push plate 68 and the other end is fixed to the chassis.

A bearing 682 is attached to the lead push plate 68 along a lower side of the slide member 63. A projection 631t and a recess 631s are formed in the lower side of the slide member 63. The rotation position of the lead push plate 68 is changed by the engagement of the bearing 682 with the projection 631t and the recess 631s.

A lead push-up member 683 is formed at a front end of the lead push plate 8.

When the lead feed/eject unit 6 is at the position shown in FIG. 12, the second engagement member 52 of the lead push plate 68 pushes up the pencil lead displacement mechanism 13 of the pencil pen 1 and the first engagement member 651 does not contact with the flange of the pencil pen.

When the lead feed/eject unit 6 moves forward or rightward and the projection 631t on the lower side of the slide member 631 comes above the bearing 682 of the lead push plate 68, that is, when the projection 631t on the lower side of the slide member 63 comes from a chain line position (e) to a chain line position (d), the lead push plate 8 is pushed down below the projection 631t so that the pencil lead displacement mechanism 13 of the pencil pen 1 is free and moves down to the low end position the first engagement member 651 above the pencil pen 1 has the raised area 651q thereof pushed down by the bearing fixed to the chassis. Consequently, the knock mechanism 11 of the pencil pen 1 is pushed down and the lead chuck mechanism 12 is released.

In the present embodiment, the lead feed/eject unit 6 moves between the positions (e) and (d) along the rail 62 under the control of the CPU 22 so that the lead chuck mechanism 12 of the pencil pen 1 and the pencil lead displacement mechanism 13 are alternately operated.

The unnecessary residual lead ejected through the above operations is detected by the lead sensor 67 provided at the predetermined position. The drive-out of the new pencil lead is also detected by the lead sensor 67.

In the present embodiment, the lead sensor 67 is mounted at the predetermined position on the lead push-up member, although it may be mounted on the chassis. The lead sensor 67 must be arranged directly below the pencil pen 1 when the ejected residual lead drops or the new pencil lead is driven out.

As the new pencil lead is driven out, the lead feed/eject unit 6 temporarily retracts to engage the bearing 682 of the lead push plate 68 with the recess 631s of the slide member 631. Under this condition, the lead push-up member 683 of the lead push plate 68 abuts against the newly driven-out pencil lead of the pencil pen 1 to adjust the drive-out length. Since the first engagement member 651 has the raised area 651q thereof engaged with the fixed bearing 653 and is pushed down, the lead chuck mechanism 12 is released. Accordingly, it does not impede the adjustment of the driven-out pencil lead. In the present embodiment, since a solenoid for the lead feed/eject operation is not used, an electrical circuit configuration is one shown in FIG. 11B. The lead feed/eject unit driven 40 and the lead detection logic circuit 42 cooperate under the control of the CPU 22.

Here, a chain line (P) shows a moving, pass of the pencil pen 1 taken out from a take-in position thereof in the turret 5.

We claim:

1. A recorder with a pencil pen having a plurality of pencil leads therein adapted to be driven out one at a time for use in recording, comprising:
   (a) the pencil pen including a lead chuck mechanism for holding and releasing the pencil lead, a knock mechanism operably linked to the lead chuck mechanism for holding and releasing the pencil lead, and a pencil lead displacement mechanism for holding the pencil lead with an appropriate friction force, said pencil lead displacement mechanism being displaceable relative to the pencil pen;
   (b) a pen block for holding the pencil pen and recording data on a record medium by the pencil pen;
   (c) lead feed/eject means including first engagement means for holding the pencil pen and engaging with the knock mechanism of the pencil pen to cause the lead chuck mechanism to hold and release the pencil lead through the knock mechanism, and second engagement means for engaging with the pencil lead displacement mechanism of the pencil pen to displace the pencil lead displacement mechanism relative to the pencil pen, for ejecting an unnecessary pencil lead of the pencil pen and drive out a new pencil lead; and
   (d) means for alternately activating said first engagement means and said second engagement means while the pencil pen is held by said lead feed/eject means.

2. A recorder according to claim 1 wherein said lead feed/eject means is a pen block for holding the pencil pen to allow recording on a record medium, said first engagement means is mounted at a predetermined position on the recorder, said second engagement means is fixed at a predetermined position on the pen block, and the means for alternately activating said first engagement means and said second engagement means is an electromechanical actuator mounted on the pen block for vertically moving the pencil pen after the pen block holding the pencil pen has been positioned at said predetermined position on the recorder.

3. A recorder according to claim 1 wherein said lead feed/eject means is a pen block for holding the pencil pen to allow recording on a record medium, said first engagement means is mounted at a predetermined position on pen block, said second engagement means is fixed at a predetermined position on the pen block, and the means for alternately activating said first engagement means and said second engagement means is an electromechanical actuator mounted on the pen block for vertically moving the pencil pen.

4. A recorder according to claim 1 wherein one or more lead feed/eject means are provided at predetermined positions on the recorder.

5. A recorder according to claim 1 further comprising an ejected lead receptacle for storing an ejected unnecessary pencil lead.

6. A recorder with a pencil pen having a plurality of pencil leads therein adapted to be driven out one at a time for use in recording, comprising:
   (a) the pencil pen including a lead chuck mechanism for holding and releasing the pencil lead, and a pencil lead displacement mechanism for holding the pencil lead with an appropriate friction force, said pencil lead displacement mechanism being displaceable relative to the pencil pen;
   (b) a pen block for holding the pencil pen and recording data on a record medium by the pencil pen;
   (c) a storage pen holder for storing a plurality of pencil pens or other recording pens and allowing exchange of pens with said pen block;
   (d) lead feed/eject means including first engagement means for holding the pencil pen and engaging with the knock mechanism of the pencil pen to cause the lead chuck mechanism to hold and release the pencil lead through the knock mechanism, and second engagement means for engaging with the pencil lead displacement mechanism of the pencil pen to displace the pencil lead displacement mechanism relative to the pencil pen, for ejecting an unnecessary pencil lead of the pencil pen and drive out a new pencil lead; and
   (e) means for alternately activating said first engagement means and said second engagement means while the pencil pen is held by said lead feed/eject means.

7. A recorder according to claim 6 wherein said storage pen holder is a storage-turret of an essentially cylindrical shape and can store a plurality of pens at a constant interval closely to an outer periphery thereof, and is rotatable in a predetermined direction.

8. A recorder according to claim 7 wherein the pencil pen is held in said lead feed/eject means from said pen block through said storage turret.

9. A recorder according to claim 8 wherein said lead feed/eject means moves back and forth relative to said storage turret to hold a desired pencil pen.

10. A recorder according to claim 8 wherein the means for alternately activating said first engagement means and said second engagement means of said lead feed/eject means for the pencil pen held by said lead feed/eject means from said turret couples said first engagement means and said second engagement means to the back-and-forth movable member of said lead feed/eject means by a cam and repeatedly moves the back-and-forth movable member back and forth in a predetermined range.

11. In a recorder with a pencil pen having a plurality of pencil leads therein,
   the pencil pen including a lead chuck mechanism for holding and releasing the pencil lead, and a pencil lead displacement mechanism for holding the pencil lead with an appropriate friction force, and a pen block for holding the pencil pen and recording data on a record medium by the pencil pen, the method comprising:
(a) issuing a command signal to remove an unnecessary pencil lead of the pencil pen and drive out a new pencil lead;
(b) alternately engaging a first engagement means with the lead chuck mechanism of the pencil pen and a second engagement means with the pencil lead displacement mechanism, in response to the command signal for feeding the lead through the pencil.

12. A method for feeding and ejecting a pencil lead according to claim 11 further comprising the step of detecting the removed unnecessary lead and the newly driven-out lead.

13. A recorder with a pencil pen having a plurality of pencil leads therein adapted to be driven out one at a time for use in recording, comprising:
(a) the pencil pen including a lead chuck mechanism for holding and releasing the pencil lead, and a pencil lead displacement mechanism for holding the pencil lead with an appropriate friction force, said pencil lead displacement mechanism being displaceable relative to the pencil pen;
(b) a pen block for holding the pencil pen and recording data on a record medium by the pencil pen;
(c) a storage pen holder for storing a plurality of pencil pens or other recording pens and allowing exchange of pens with said pen block;
(d) lead feed/eject means including first engagement means for holding the pencil pen and engaging with the knock mechanism of the pencil pen to cause the lead chuck mechanism to hold and release the pencil lead through the knock mechanism, and second engagement means for engaging with the pencil lead displacement mechanism of the pencil pen to displace the pencil lead displacement mechanism relative to the pencil pen, for ejecting an unnecessary pencil lead of the pencil pen and drive out a new pencil lead, and further including a movable member movable back and forth relative to said storage pen holder;
(e) means for alternately activating said first engagement means and said second engagement means while the pencil pen is held by said lead feed/eject means, and for coupling the activation of said first engagement means and said second engagement means to the back and forth motion of the movable member of said lead feed/eject means by a cam.

* * * * *